(12) United States Patent
Ribeiro et al.

(10) Patent No.: US 11,623,757 B2
(45) Date of Patent: Apr. 11, 2023

(54) HYBRID ELECTRIC TAXI SYSTEM (HETS) OR FULL ELECTRIC TAXI SYSTEM (FETS)

(71) Applicant: Embraer S.A., São José dos Campos-SP (BR)

(72) Inventors: Raphael Felipe Gama Ribeiro, São José dos Campos (BR); Francisco Palazzo Neto, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 201 days.

(21) Appl. No.: 16/435,212

(22) Filed: Jun. 7, 2019

(65) Prior Publication Data

US 2019/0375512 A1   Dec. 12, 2019

Related U.S. Application Data

(60) Provisional application No. 62/682,711, filed on Jun. 8, 2018.

(51) Int. Cl.
| | |
|---|---|
| *B64D 35/08* | (2006.01) |
| *B64D 31/14* | (2006.01) |
| *B64D 27/10* | (2006.01) |
| *B64D 27/24* | (2006.01) |
| *B64D 35/02* | (2006.01) |
| *F02C 6/20* | (2006.01) |
| *B64D 41/00* | (2006.01) |
| *B64D 27/02* | (2006.01) |

(52) U.S. Cl.
CPC ............. *B64D 35/08* (2013.01); *B64D 27/10* (2013.01); *B64D 27/24* (2013.01); *B64D 31/14* (2013.01); *B64D 35/02* (2013.01); *B64D 41/00* (2013.01); *F02C 6/20* (2013.01); *B64D 2027/026* (2013.01); *B64D 2221/00* (2013.01)

(58) Field of Classification Search
CPC ........ B64D 35/08; B64D 27/24; B64D 41/00; B64D 2027/026
See application file for complete search history.

(56) References Cited

U.S. PATENT DOCUMENTS

| | | | | |
|---|---|---|---|---|
| 8,324,746 | B2 * | 12/2012 | Bradbrook | F02C 7/32 |
| | | | | 290/1 A |
| 10,662,875 | B2 * | 5/2020 | Lafargue | B64D 31/14 |
| 10,717,539 | B2 * | 7/2020 | Menheere | F02C 7/32 |
| 2002/0030137 | A1 * | 3/2002 | Kirjavainen | B64C 29/00 |
| | | | | 244/51 |
| 2016/0236790 | A1 * | 8/2016 | Knapp | B64C 11/44 |
| 2017/0320584 | A1 * | 11/2017 | Menheere | B64D 27/24 |

* cited by examiner

*Primary Examiner* — Philip J Bonzell
*Assistant Examiner* — Ashesh Dangol
(74) *Attorney, Agent, or Firm* — Nixon & Vanderhye P.C.

(57) ABSTRACT

For aircraft taxiing, an aircraft is equipped with an electric machine installed in a propulsor gearbox (PGB), in parallel to the gas turbine, working in motor mode during taxi, and in generator mode during flight phases (such as take-off, climb, cruise, descent, approach and landing). Typical current systems which use an electric machine in the PGB do not use the electric machine in motor mode for taxi operations (i.e., it is only an additional generator). An optimized power supply providing a combination of a thermal engine such as an Auxiliary Power Unit (APU) and an electric energy storage system such as a battery provides power to the PGB electric machine even when the gas turbine is off.

16 Claims, 3 Drawing Sheets

HYBRID ELECTRIC TAXI SYSTEM (HETS) OR FULL ELECTRIC TAXI SYSTEM (FETS)

CROSS-REFERENCE TO RELATED APPLICATIONS

This application claims benefit of U.S. Provisional Application No. 62/682,711 filed Jun. 8, 2018, incorporated herein by reference.

STATEMENT REGARDING FEDERALLY SPONSORED RESEARCH OR DEVELOPMENT

None.

FIELD

The example non-limiting technology herein relates to aircraft propulsion systems, and more particularly, to efficient aircraft propulsion while the aircraft is on the ground.

BACKGROUND

Aircraft are typically pulled back from the departure gate using a tug. They then taxi to the runway under their own power. Similarly, after landing on the runway, aircraft typically taxi under their own power to the arrival gate. The wheels of most aircraft are not powered, so the thrust needed to move the aircraft along the taxiway typically comes from the aircraft's engines.

Currently therefore, commercial aircraft employ main propulsion engines to conduct taxi maneuvers (both acceleration and steady-state). The majority of engines powering commercial aircraft are based on gas turbines (Brayton cycle). The gas turbine thermal efficiency is driven primarily by the cycle temperatures, pressures and component (i.e., compressors and turbines) efficiencies (the higher those parameters, the higher the gas turbine thermal efficiency, resulting in lower fuel consumption for a given power setting).

Taxi power settings are commonly around the Ground Idle ratings, in which the engine speed, temperatures, pressures and component efficiencies are much smaller than the values found in high-power operation. Therefore, the main engines are typically very inefficient to provide thrust to the aircraft in ground operations. Typical thermal efficiency of gas turbines in idle conditions may range from 5-15%, while in high power, cruise conditions, thermal efficiencies are in the 35-55% range, depending heavily on the size of the considered turbo machine (smaller engines are more inefficient due to size effects). Simply put, because the aircraft's gas turbine engines are designed to be efficient during flight, they are consequently usually not very efficient for ground operation.

In regional aircraft, the fuel consumption for ground maneuvers may represent a significant percentage of the block fuel (i.e., mission fuel burn), since the flight times and mission ranges are shorter. Therefore, this type of aircraft is particularly sensitive to the fuel burn during the taxi phases.

In the last decades, a number of system concepts were developed in order to decrease the fuel consumption during taxi operations. These concepts may be grouped in two different basic approaches, which are better discussed in the sections below.

Wheel-Driven Electric Taxi

The basic idea behind this concept is to install electric motors in the aircraft wheels (nose and/or main landing gear). These electric motors provide torque to the wheels which then provide propulsive force for ground operations. Electrical power to feed the referred electric engines may be provided via the Auxiliary Power Unit (APU) generator (more common solution) and/or batteries or capacitors.

The pros and cons of such a solution include:

Advantages:

The wheel electric motors have much greater efficiencies (in the order of 85%-95%) when compared to Gas turbines, especially when the gas turbine is operating at low power levels. Therefore, the solution when installed in an aircraft has the potential to decrease fuel consumption.

Disadvantages:

Additional systems are required (Electrical motors, bigger APU and APU generator, power electronics, cooling systems for the power controls).

Landing gears may need to be structurally reinforced.

Due to the referred additional systems, costs and weight are added to the aircraft, sometimes off-setting the electric motor higher efficiency in the taxi phases. Therefore, block fuel reduction may be marginal or even negative.

Taxi performance may be degraded, since the motors will have limited power/torque capability (in order to avoid adding too much weight to the aircraft, rated power may be limited).

Electric motors installed within the Gas turbine package

An electric motor may be installed in one of the shafts of a gas turbine. This electric motor may be concentric with the gas turbine shafts and may provide power to the propulsor (fan or propeller) during ground operations, while the thermal engine is turned off to save fuel.

The pros and cons of this prior solution include:

Advantages:

The wheel electric motors have much greater efficiencies (in the order of 85%-95%) when compared to Gas turbines, especially when the gas turbine is operating at low power levels. Therefore, the solution when installed in an aircraft has the potential to decrease fuel consumption.

Does not require the installation of dedicated electric motors in the aircraft wheels/landing gears, since the thrust is generated via the propulsor of the main engine (fan or propeller).

Disadvantages:

The solution needs to be designed together with the engine design from the start as an integrated design, since the electric motor is embedded in the gas turbine, resulting in significant impacts in the engine architecture. Therefore, the solution is only applicable to new engine designs.

Maintainability of the embedded engine may be challenging, since it is installed within the gas turbine shafts. Operating temperatures may also be a challenge.

Accordingly, while work has been done in the past, further improvements are needed.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

Figure 1:
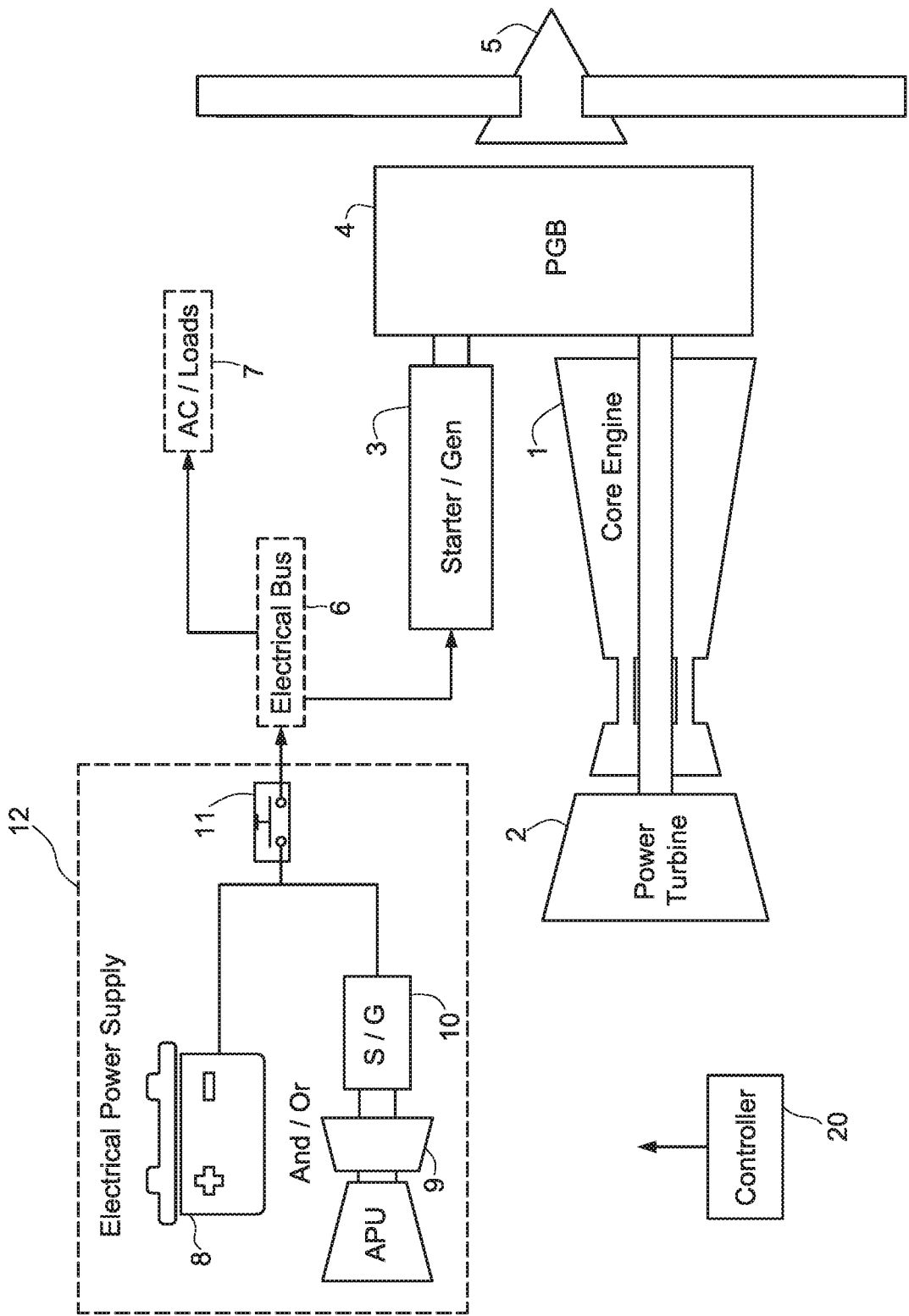
FIG. 1 shows an example non-limiting propeller architecture.
Figure 2:
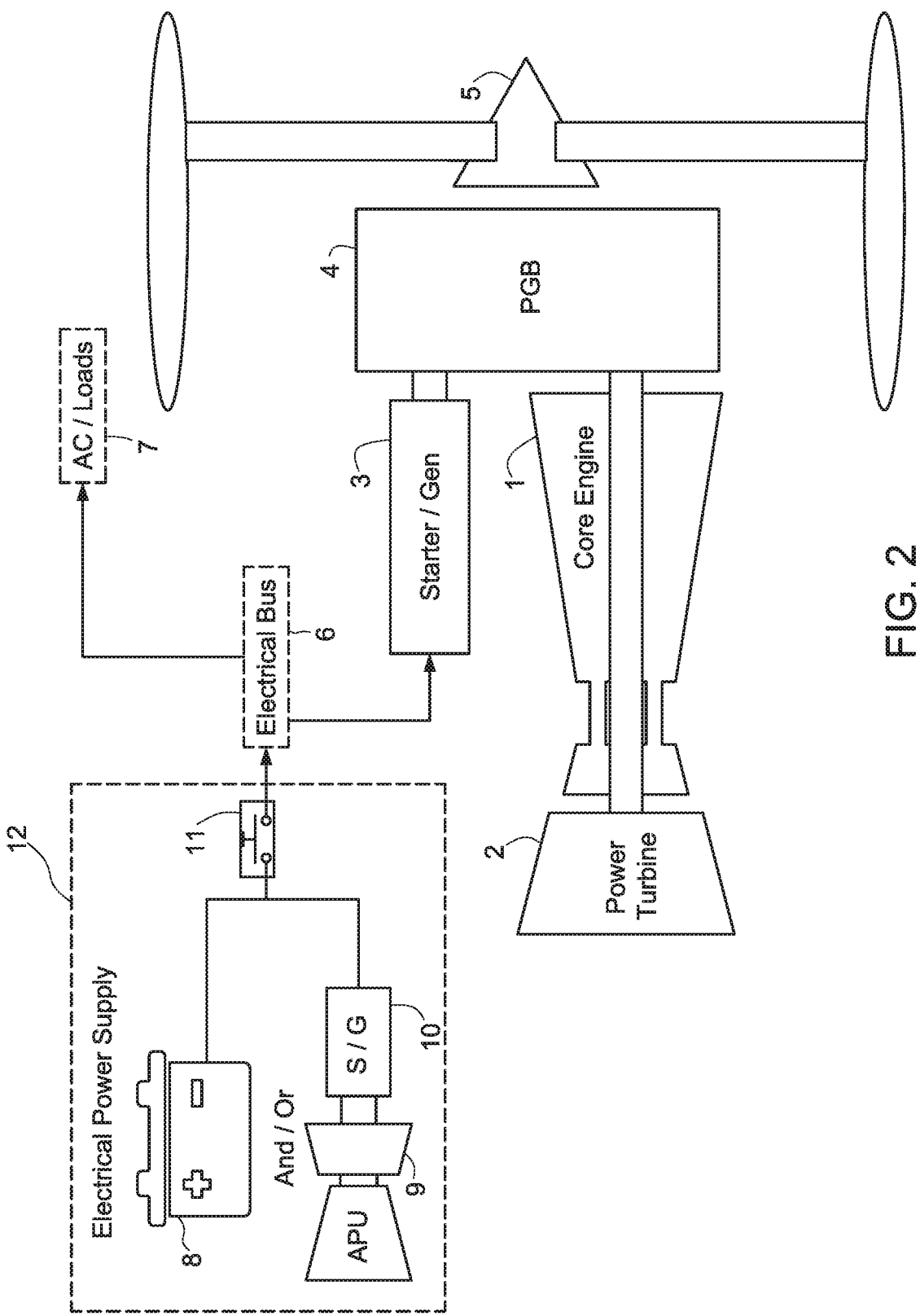
FIG. 2 shows an example non-limiting fan architecture.

A schematic layout of an example non-limiting propeller architecture based system is shown in FIG. 1. The main components are listed from 1 to 11. A core engine (1), comprising a compressor, combustion chamber and a turbine (mechanically coupled to the compressor), is defined as the engine core. A free power turbine (PT) (2), mechanically de-coupled but aerodynamically coupled to the core engine, is connected to a propulsor gearbox (PGB) (4). Other core engine arrangements may be considered, including two or more shaft architectures, often found in gas turbine engines. The referred propulsor may be a Propeller (ducted or unducted, single plane or multi-planes, co-rotating or contrarotating) or a Fan (see FIG. 2).

During flight operations (e.g., take-off, climb, cruise, descent, approach and landing), fuel is provided to the core engine 1, which produces a hot, compressed gas output, which powers the power turbine 2, providing torque to the PGB 4 and to the propulsor (5), generating propulsive thrust to propel the aircraft.

An electric starter/generator (3) is coupled to the PGB 4, in parallel to the gas turbine 1. During the quoted flight operations, the electric machine 3 is working in generator mode, providing electric power to the aircraft electric bus (6). The electric bus 6 feeds the aircraft loads (7), which may be of very different nature (such as, but not limited to—lightning, communications, navigations, hydraulics, ice protections, environmental control systems (ECS) providing air conditioning, etc.). The electric bus 6 may also recharge electric energy storage devices (8) during flight, such as batteries or capacitors, via dedicated electric switches (11). This recharge strategy may be interesting from an energy standpoint since the gas turbine 1 thermal efficiency in high power settings is considerably higher, as previously mentioned, reaching the 40-55% range.

During ground operations (e.g., taxi-in, taxi-out, pushbacks, etc.), the core engine (1) fuel supply is turned off. An electric power supply source (12) is activated and coupled to the Electric bus (6) via adequate electric switches (11). The electric power supply (12) may be a combination of electric energy storage devices (8) (such as batteries and capacitors) with other power generation systems, such as an APU (9) or other thermal engines coupled to an electric starter/generator ("S/G") (10). The energized electric bus 6 provides electric power to the PGB starter/generator (3), which operating in motor mode provides power to the PGB 4, which turns the PT 2 and the propulsor 5. The propulsor 5 provides propulsive thrust to propel the aircraft during ground operations.

Figure 3:
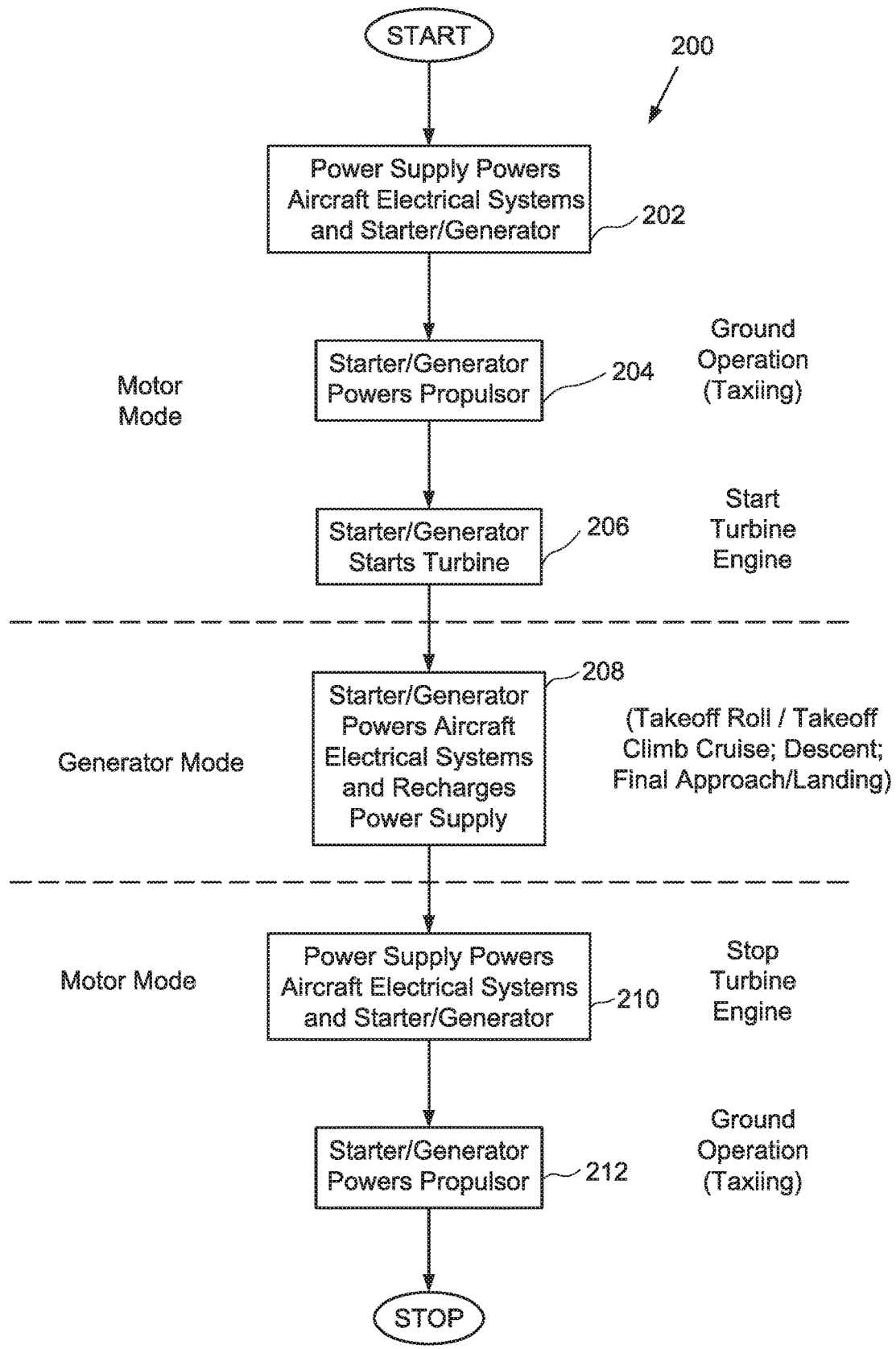
FIG. 3 shows an example non-limiting process flowchart.

The method described above is summarized in Table 1 and in the FIG. 3 process flowchart.

In an example non-limiting embodiment, one or more electronic controllers 20 control the operating modes of the various described components. Such controller(s) 20 may execute program instructions stored in non-transitory memory, or they may be implemented as programmable gate arrays or other programmed logic circuitry. In one example non-limiting embodiment, controller 20 detects that power has been turned on and controls starter/generator 3 to start in the motor mode.

During taxi-out, controller 20 operates switch 11 so that battery 8 and/or APU 9 and S/G 10 powers electric machine 3 operating in the motor mode. The power supply 12 may also also power aircraft electrical loads 7 such as the ECS via the electrical bus 6. The starter/generator 3 powered by the electrical power from the power supply 12 supplies mechanical power to PGB 4, which turns the power turbine 2 and the propulsor 5. The gas turbine engine 1 remains off during this time, but the the electric machine 3 powers propulsor 5 to supply forward thrust to move the aircraft forward on the taxiway. In some embodiments, controller 20 controls gearbox 4 to couple mechanical power the electric machine 3 produces to power the propulsor 5.

Just before takeoff, the pilot starts the gas turbine engine 1. In some embodiments, the controller 20 may assist in this operation by operating starter/generator 3 as a starter motor for the gas turbine 1 (e.g., if the gas turbine has a single shaft arrangement). Once the gas turbine 1 is running, the controller 20 switches the operating mode of starter/generator 3 from motor mode to generator mode. The starter/generator 3 uses magnetic fields and windings to convert the mechanical rotational power supplied by the core engine 1 through the gearbox 4 into electrical energy. In some embodiments, the controller 20 may control PGB 4 to decouple the propulsor 5 from the electric machine 3 and/or change gear ratios and/or gear configurations so mechanical power generated by the gas turbine 1 shaft is coupled to turn starter/generator 3 at an appropriate rotational speed to generate electrical power.

During flight phases, the starter/generator 3 supplies electrical power to the aircraft loads 7 via the electrical bus 6. Controller 20 can also act as a charge controller to control switch 11 to selectively close, thereby allowing the starter/generator 3 to supply power to recharge battery 8 while preventing overcharging. Once the controller 20 detects that the battery 8 is fully charged, it can operate switch 11 to disconnect the battery from the starter/generator 3 to prevent overcharging. In some embodiments, the starter/generator 3

TABLE 1

System operation - summary

| # | Ref Mission Phase | Battery 8 | APU 9 | AC Electrical Bus 6 | Starter/Gen 3 | Main Engines 1 |
|---|---|---|---|---|---|---|
| 01 | Power-on | Initiate | Turn on | Turn on | Start motor mode | OFF |
| 02 | Taxi-out | Powers AC El. BUS 6 | Powers AC El Bus 6 + ECS Air conditioner | ON | Motor mode | OFF |
| 03 | Take-off | Depleted | OFF | ON | Generator mode | ON |
| 04 | Climb/Cruise/ Descent/LDG | In-flight Recharge | OFF | ON | Generator mode | ON |
| 05 | Taxi-in | Power AC El. Bus 6 | Powers AC El Bus 6 + ECS Air conditioner | ON | Motor mode | OFF | has the capability of regenerating power obtained from a propeller acting as a wind turbine during descent or landing phases.

Upon landing, once the controller 20 detects that the pilot has turned off the gas turbine engine 1, the controller returns the starter/generator 3 and switch 11 to the same generator configuration used during taxiing before takeoff Expected Benefits The electric motor installed in the PGB 4 has two main functions: propel the aircraft during ground operations (motor mode), and provide electric power to the aircraft bus 6 (generator mode) during flight operations. Therefore, the same machine is used for several purposes—in other words, the system does not require the installation of dedicated electric motors to perform the taxi manoeuvres (as required for example in the wheel-driven electric taxi).

In one example non-limiting embodiment, the electric motor is installed in the PGB 5 in parallel to the main gas turbine engines, avoiding impacts in the main engine architecture. In other words, the gas turbine architecture can be designed as a conventional engine, without having the need to provision mechanical installation of electric motors in the engine shafts (as required in the systems which employ an electric motor concentric to the gas turbine shafts). Maintainability of the PGB gearbox 4 is also easier when compared to the concentric installation of an electric engine.

The solution can provide better results for a More Electric Aircraft (MEA) system architecture, which electrifies several systems (ECS, Ice protection, etc.), since it re-uses several electric systems already installed on the aircraft to perform the electric taxi.

The propulsor driven electric taxi has the potential to decrease the Block Fuel consumption of the aircraft, increasing the aircraft efficiency and competitiveness.

There is the potential to perform the push-back maneuver using the proposed system; since the tug-driven push-back maneuver has an associated cost, the system has the potential to dismiss the tug and push the aircraft autonomously, potential reducing other operational costs than those associated with fuel consumption.

If the system employs electric energy storage systems 8 (such as batteries), the batteries' weight can be reduced over time with the development of batteries with higher power densities, as shown in Table 2.

TABLE 1

Battery energy density forecast (*All estimated data).

| EIS | Battery energy density |
| --- | --- |
| 2025 | 250 Wh/kg (*) |
| 2030 | 300 Wh/kg (*) |
| 2035 | 500 Wh/kg (*) |
| 2040 | 800 Wh/kg (*) |

Example Features and Advantages of the Example Non-Limiting Technology Include:

System architecture and method: system with the electric machine 3 installed in the PGB 4, in parallel to the gas turbine 1, working in motor mode during taxi, and in generator mode during flight phases (such as take-off, climb, cruise, descent, approach and landing). Typical current systems which use an electric machine in the PGB 4 do not use the electric machine in motor mode for taxi operations (i.e., it is only an additional generator).

Optimized power supply: combination of a thermal engine such as an APU and an electric energy storage system such as a battery to provide power to the PGB electric machine.

The electric machine may have an efficiency on the order of 85%-95% when operating as a motor for the propulsor 5

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An aircraft propulsion system for an aircraft of the type including a gas turbine engine having a single power turbine shaft, the system comprising:
   a gearbox directly coupled to the gas turbine engine single power turbine shaft, and also coupled to a second shaft and a third shaft;
   a propulsor directly coupled to the gas turbine engine single power turbine shaft through the third shaft of the gearbox, the propulsor being configured to use rotational energy the gas turbine engine single power turbine shaft provides to propel the aircraft during some phases of flight of the aircraft such as takeoff and being further configured to act as a wind turbine during descent and/or landing flight phases of the aircraft;
   an electric machine mechanically operatively coupled to the second shaft of the gearbox, the electric machine and the gas turbine engine single power turbine shaft being coupled to parallel to the propulsor through the gearbox, the electric machine being configured to work in a motor mode to power the propulsor through the second and third shafts of the gearbox during taxiing and to work in a generator mode to convert to electricity, rotational energy the propulsor acting as a wind turbine produces during the descent and/or landing flight phases; and
   a power supply operatively coupled to the electric machine, the power supply supplying stored electrical power to the electric machine operating in the motor mode during taxiing and receiving and storing electrical power from the electric machine operating in the generator mode during the descent and/or landing flight phases to thereby contain harvested kinetic energy from the propulsor incoming airflow during a descent phase and subsequently discharge the captured energy to reuse it in the motor mode for aircraft taxi.

2. The system of claim 1 wherein the power supply is configured to provide a combination of a thermal engine such as an Auxiliary Power Unit (APU) and an electric energy storage system such as a battery to provide power to the electric machine during taxi-out when the gas turbine engine is off.

3. The system of claim 1 wherein the electric machine is also configured to rotate the gas turbine engine to start it.

4. The system of claim 1 further including a controller that switches the electric machine between the motor mode and the generator mode.

5. The system of claim 1 further including a controller that selectively charges the power supply with power produced by the electric machine during the descent and/or landing phases.

6. The system of claim 1 wherein the gearbox selectively mechanically couples the electric machine to the propulsor when the electric machine is operating in the motor mode.

7. The system of claim 1 wherein the electric machine comprises an electric motor that has an efficiency of 85% or more when operating in the motor mode to power the propulsor to produce thrust for taxiing.

8. The system of claim 1 wherein the propulsor comprises a propeller, and the electric machine is operable to regenerate power obtained from the propeller acting as a wind turbine engine during descent and/or landing phases for storage and powering the electric machine operating as a motor during subsequent taxiing without turning on the gas turbine engine.

9. A method for taxiing of an aircraft of the type including a gas turbine engine having a single power turbine shaft that is directly coupled to a gearbox, the method comprising:

controlling the gas turbine engine to directly provide rotational energy through the single power turbine directly coupled shaft and a gearbox to a propulsor to propel the aircraft during some phases of flight of the aircraft such as takeoff;

mechanically coupled an electric machine to the propulsor through a second shaft of the gearbox so the electric machine and gas turbine engine are coupled in parallel to the propulsor;

opening the electric machine in a motor mode to provide rotational energy to the propulsor during taxing while also turning the gas turbine single power turbine shaft;

operating the electric machine in a generator mode to convert to electricity, rotational energy the propulsor acting as a wind turbine produces during descent and landing;

supplying stored electrical power from (a) a power supply that is operatively coupled to the electric machine, (b) to the electric machine operating in the motor mode during taxiing; and receiving and storing electrical power from the electric machine operating in the generator mode during the descent and/or landing flight phases, thereby containing harvested kinetic energy from the propulsor incoming airflow during a descent phase and subsequently discharging the captured energy and reusing it to apply to the electric machine operating in the motor mode for taxing.

10. The method of claim 9 including configuring the power supply to provide a combination of a thermal engine such as an Auxiliary Power Unit (APU) and an electric energy storage system such as a battery to provide power to the electric machine during taxi-out when the gas turbine engine is off.

11. The method of claim 9 wherein the electric machine comprises a starter/generator and the method includes operating the starter/generator to rotate the gas turbine engine to start it.

12. The method of claim 9 further including using a controller to switch the electric machine between the motor mode and the generator mode.

13. The method of claim 9 further including using a controller to selectively charge the power supply with power produced by the electric machine during flight phases.

14. The method of claim 9 further including selectively connecting the electric machine to the propulsor via the gearbox when operating in the motor mode.

15. The method of claim 9 wherein the electric machine comprises an electric motor/generator having an efficiency of 85% or more when operating in the motor mode to power the propulsor to produce thrust for taxiing.

16. The method of claim 9 further including the electric machine regenerating power obtained from the propulsor comprising a propeller acting as a wind turbine during descent and/or landing phases and storing the regenerated power for powering the electric machine operating as an electric motor during subsequent taxiing without turning on the gas turbine engine.

* * * * *